(12) United States Patent
Learmonth et al.

(10) Patent No.: US 7,036,742 B2
(45) Date of Patent: May 2, 2006

(54) METHOD AND APPARATUS FOR SAFE DATA READING AND WRITING TO A MEMORY CARD READER DEVICE

(76) Inventors: Tom Learmonth, 1202 E. Wakeham Ave., Santa Ana, CA (US) 92705; Gary Kung, 1202 E. Wakeham Ave., Santa Ana, CA (US) 92705

( * ) Notice: Subject to any disclaimer, the term of this patent is extended or adjusted under 35 U.S.C. 154(b) by 144 days.

(21) Appl. No.: 10/754,345

(22) Filed: Jan. 10, 2004

(65) Prior Publication Data
US 2004/0140359 A1 Jul. 22, 2004

(30) Foreign Application Priority Data
May 14, 2002 (TW) .............................. 91206817 U

(51) Int. Cl.
*G06K 19/06* (2006.01)

(52) U.S. Cl. ...................................... 235/492
(58) Field of Classification Search ................ 235/492; 439/144, 489
See application file for complete search history.

(56) References Cited

U.S. PATENT DOCUMENTS 6,488,528 B1 * 12/2002 Nishioka .................... 439/489
2002/0115320 A1 * 8/2002 Nishio et al. ............... 439/144

* cited by examiner

*Primary Examiner*—Karl D. Frech
*Assistant Examiner*—Lisa M. Caputo
(74) *Attorney, Agent, or Firm*—Law Offices of John Chupa & Associates, P.C.

(57) ABSTRACT

The present invention relates to a memory card reader which has a eject button; an electrical switch which senses when the eject button is in an inactive rest position. When a memory card is inserted through an aperture in the front bezel it sits at a depth to ensure the rear face of the memory card is at least flush with the bezel surface. The memory card acts on a second electrical switch contact to indicate when it is fully seated. Sensing the state of both switches allows the condition of a) the card being fully seated and b) that there is no card movement, to be detected. To eject the memory card the user must use the eject button which acts on an eject lever to push the card outwards through the aperture in the front bezel. The present invention also relates to a method for safely reading from and writing to a memory card reader device.

20 Claims, 7 Drawing Sheets

METHOD AND APPARATUS FOR SAFE DATA READING AND WRITING TO A MEMORY CARD READER DEVICE

FIELD OF THE INVENTION

The invention generally relates to a method and a memory card reader device, and more particularly to a method and a memory card reader device that has been used in any electronic media products utilizing removable memory cards which may be flash based, such as Compact Flash, Multi-Media Card, Secure Digital, Memory Stick, xD Picture Card, Smart Media, or IC cards such as Smartcards.

BACKGROUND OF THE INVENTION

A frequent requirement is to read or write data to memory cards. Each time a memory card is accessed; there is a risk of data corruption if the connection to the card is unexpectedly interrupted mid-process. For this reason it has been common to detect the presence of a card either by a "card detect" signal using one of the card's own contact pads or a switch mechanically activated by the card.

Both of these methods have the weakness of only being able to indicate a "card detect" status, and that detect range will extend over a certain distance. The card can be moving while the detect status is valid. This is a poor indicator to the control electronics performing the read and write operations on the memory card, and there is a risk of data corruption.

To Attempt to solve this unsatisfactory situation a solution has been devised in U.S. 6,488,528 patent where a switch senses that the card is physically seated and locked in the reader by a tab, which locates into a cut-out formed in the card. In practice a reader using U.S. 6,488,528 patent cannot work with all memory cards. Card types such as Smart Media and Smartcards do not contain any cut-outs into which a tab can locate, so they can not be locked. Furthermore, an undesirable situation arises where a user tries to pull out a locked card: The user has no knowledge of the locking function; as it is unseen and internal to the device, this can easily result in damage.

The present invention overcomes these deficiencies and weaknesses by allowing the controlling electronics to only perform the read and write operations on the memory card when the memory card is fully seated and at rest, thereby eliminating the possibility of data corruption due to unexpected card disconnection. The user can only extract the memory card by use of the push button.

Since the invention does not make use of any card cut-out feature its use is applicable to all memory card types.

SUMMARY OF INVENTION

An object of the present invention is to provide a memory card reader device that ensures the safe performance of the data read and write operations; therefore the memory card must not be disconnected unexpectedly.

Another object of the present invention is to provide a method for safely reading from and writing to a memory card reader device. To ensure safe data read and write operations the memory card must not be disconnected unexpectedly.

The method and memory card reader device of the present invention achieves these aims by detecting when the memory card is fully seated and at the same time the only means of card ejection, the election button, is inactive. The user cannot unexpectedly pull the memory card out of the reader assembly because the aperture in the front bezel ensures that when the card is fully seated there is no grip possible on the surface of the card.

For achieving the aforesaid object, the memory card reader device of the present invention comprises: a housing, having a slot on its front bezel; an eject button, slidably mounted in the housing, further comprising an elasticity element for compressing the eject button and making the first switch turn into a normal close state; a join mechanism, pivotably mounted in the housing, and while the eject button is being compressed or a memory card is being inserted the join mechanism is being actuated; a first switch, positioned on a side of the housing and coupled to the power for controlling and ensuring that the memory card reader device must be in an off state before the memory card is ejected; a second switch, also positioned on the side of the housing for detecting the memory card whether it is fully inserted or not; thereby, while inserting the memory card into the slot of the memory card reader device, the join mechanism is compressed by the memory card, and it makes the second switch turn into a on state, and then makes the first switch and the second switch turn into a close loop state, thus the power passes to the memory card reader device so that the memory card reader device can read data from or write data to the memory card; while compressing the ejecting button, the elasticity element is compressed by the ejecting button and makes the first switch turn into a off state, and makes the memory card eject from the memory card reader device.

For achieving the aforesaid object, the method of the present invention comprises the steps of: providing a first switch, a second switch, a join mechanism, and an eject button, wherein, the first switch is coupled to the second switch, another switch is coupled to the ground while the first switch or the second switch is coupled to the power, and the ejecting button further comprising an elasticity element; inserting the memory card into a slot of the memory card reader device, meanwhile, the join mechanism is compressed by the memory card, and makes the second switch turn into an on state, and makes the first switch and the second switch turn into a close loop state, thus the power passes to the memory card reader device so that the memory card reader device can read data from or write data to the memory card; and pressing said ejecting button, meanwhile, said elasticity element is compressed by the said ejecting button and it makes the said first switch turn into an off state, and makes the said memory card eject from the said memory card reader device by compressing the said join mechanism, and forces the said first switch and the said second switch to turn into an off state, and then makes the said power and the said memory card turn into an open loop state so as to eject the memory card, while the user does not have to continually compress the ejecting button, the elasticity element will force the ejecting button back to its original position and make the first switch turn into the close state and the second switch turn into the open state.

The novel features of the invention are set forth with particularity in the appended claims. The invention will be best understood from the following description when read in conjunction with the accompanying drawings.

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

The following detailed description illustrates the invention by way of example, not by way of limitation of the principals of the invention. This description will clearly enable one skilled in the art to make and use the invention, and describes several embodiments, adaptations, variations, alternatives, and uses of the invention. The description includes what are presently believed to be the best mode of carrying out the invention.

Figure 1:
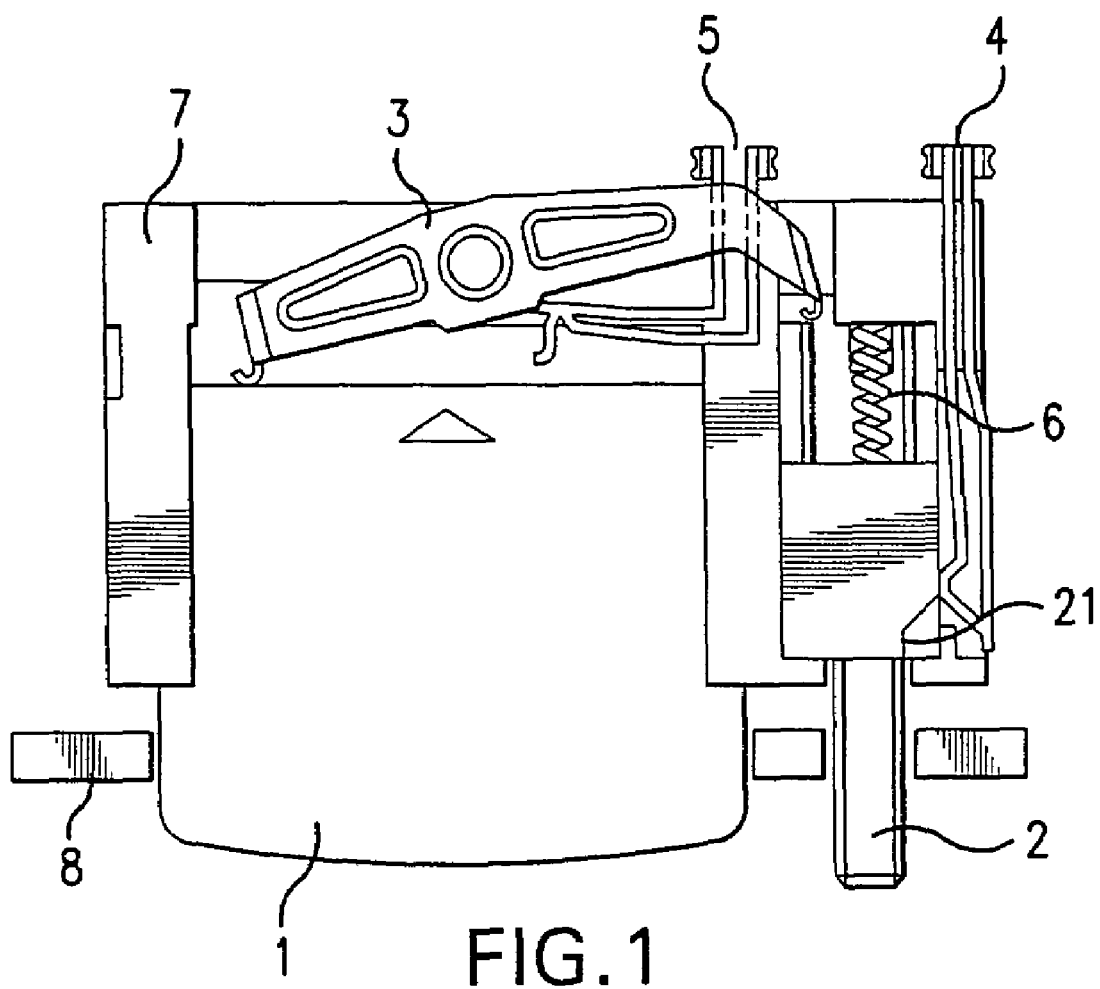
FIG. 1 is a perspective view of a memory card reader device in accordance with an embodiment of the present invention.

Please refer to FIG. 1, which shows a perspective view of a memory card reader device in accordance with an embodiment of the present invention. As shown in FIG. 1 a memory card reader device according to an embodiment of the present invention comprises: a housing 7, an eject button 2, a join mechanism 3, a first switch 4, and a second switch 5. A memory card 1 can be inserted into the housing 7 for the purpose of reading or writing. Wherein, existing card types known today include Compact Flash (type I an type II), IBM Microdrive, Multi-Media Card, Secure Digital card, Memory Stick (standard, Pro, Duo), xD Picture Card, and Smart Media card.

Wherein, the housing 7, having a slot (not shown) behind its front bezel 8; the eject button 2, slidably mounted in the housing 7, further comprising an elasticity element 6 and a notch 21, wherein the elasticity element 6 is for example, but not limited to, a spring element or an elastomer to compress the eject button 2 and makes the first switch 4 turn into a normal close (NC) state and the notch 21 to aid the second switch 5 in sensing the position of the eject button 2; the join mechanism 3 is for example, but not limited to, an eject lever, pivotably mounted in the housing 7, and the join mechanism is actuated when the eject button 2 is being compressed or the memory card 1 is being inserted.

The first switch 4 is for example, but not limited to, a normal close (NC) switch, positioned on a side for example, but not limited to, a rear side of the housing 7 and coupled to the power (not shown) for controlling and ensuring that the memory card reader device must be in an off state before the memory card 1 can be ejected; and the second switch 5 is for example, but not limited to, a normal open (NO) switch, also positioned on the side of the housing 7 and beside the first switch 4 to detect the memory card 1 whether it is fully inserted or not.

Figure 2:
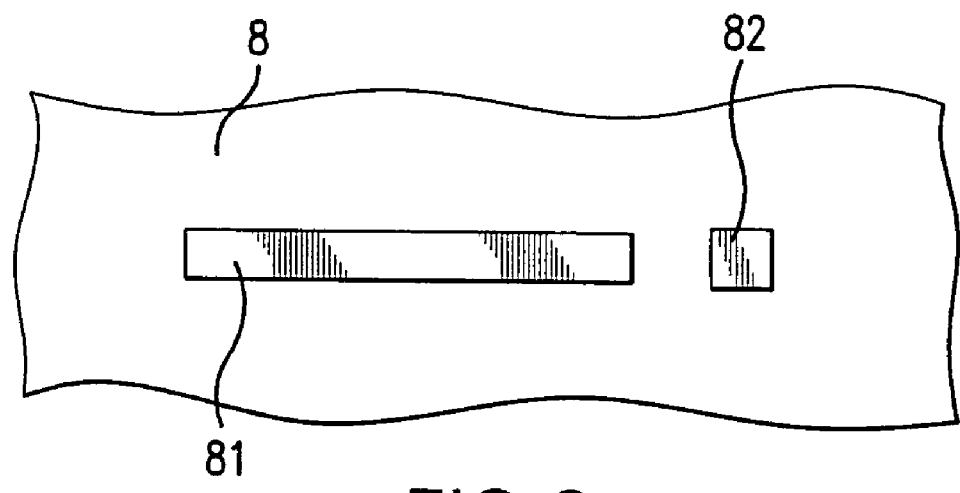
FIG. 2 shows a perspective view that the bezel 8 of the present invention further comprises a first aperture 81 and a second aperture 82 to ensure the rear face of the fully seated memory card 1 is at least flush with the front surface of bezel 8 in accordance with the embodiment of the present invention.

Please refer to FIG. 2, which shows that the bezel 8 further comprises a first aperture 81 and a second aperture 82 to ensure that the rear face of the fully seated memory card 1 is at least flush with the front surface of bezel 8. As shown in FIG. 2, the bezel 8 of the present invention further comprises a first aperture 81 and a second aperture 82. Wherein, the aperture 81 is for example, but not limited to, a rectangular aperture that is located before and aligned to the slot of the housing 7 to ensure that the rear face of the fully seated memory card 1 is at least flush with the front surface of bezel 8. While the aperture 82 is for example, but not limited to, a square aperture that is located beside the aperture 81 and makes the eject button 2 outwardly protrude from the bezel 8 so that the user can conveniently press the eject button 2.

Figure 3A:
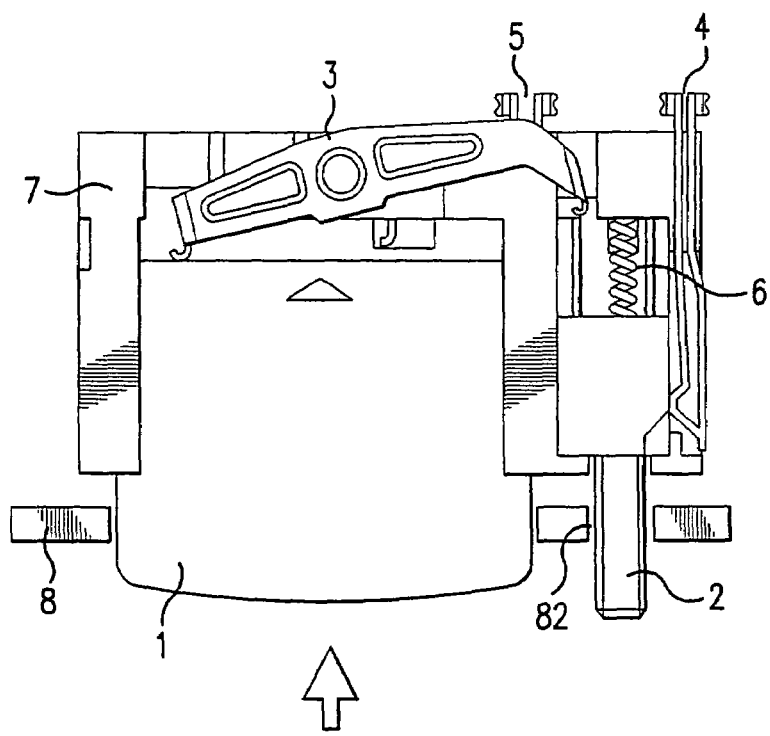
FIGS. 3a–3f, which respectively shows a multi-stage sequence for the device operation of the memory card reader device as shown in FIG. 1 in accordance with the embodiment of the present invention.
Figure 3B:
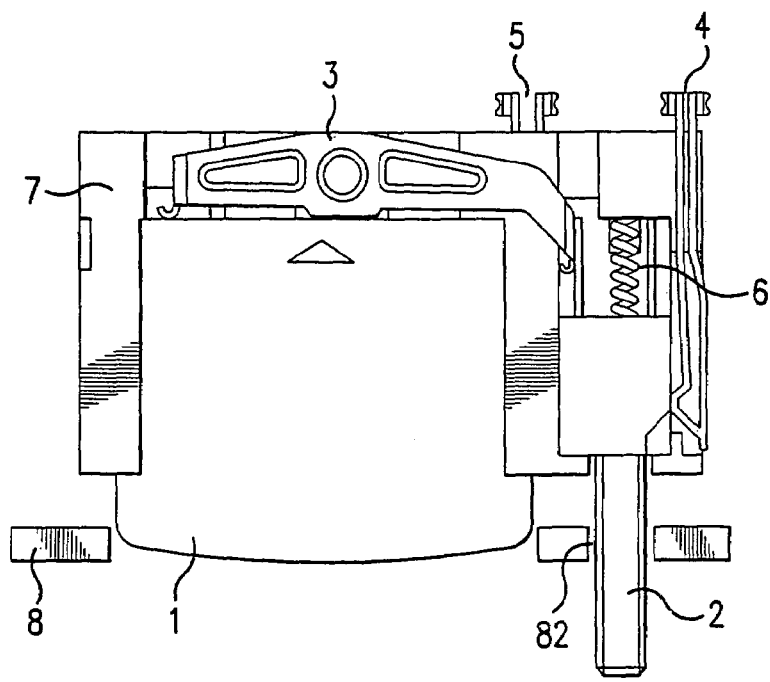
Figure 3C:
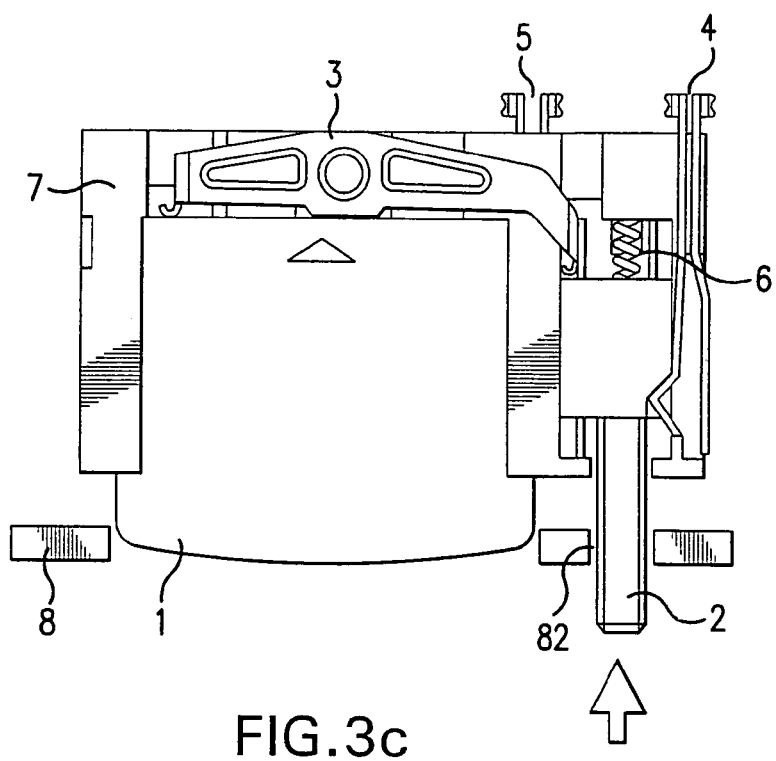

Please refer to FIGS. 3a–3c, which respectively shows a multi-stage sequence for the device operation of the memory card reader device, as shown in FIG. 1 in accordance with an embodiment of the present invention. As shown in FIG. 3a, which shows a memory card 1 that is being inserted into the housing 7. In one embodiment of the present invention which is shown in FIG. 2, the device initially has the eject button 2 fully extended due to the action of the spring 6 and, therefore, switch 4 is "true" (close), the eject lever 3 may be in any position, but switch 5 is "false" (open) as the memory card 1 is not present.

Please refer to FIG. 3b, which shows a memory card 1 fully seated into the housing 7. The memory card 1 is fully seated. When a user inserts the memory card 1 through the aperture 81 in the front bezel 8, meanwhile, the eject lever 3 is compressed by the memory card 1. And it makes the second switch 5 turn into an on state; and then it makes the first switch 4 and the second switch 5 turn into a close loop state; thus, power passes to the memory card reader device so that the memory card reader device can read data from or write data to the memory card 1. The user cannot pull the card 1 out because there is no edge accessible protruding from the bezel aperture 81 for the user to gain a grip on.

The first switch 4 and the second switch 5 only indicate a "true" (close) condition simultaneously where the memory card 1 is fully seated and the eject button 2 is in its inactive position. In the embodiment of the present invention illustrated, the first switch 4 senses the position of the eject button 2 with the aid of a notch 21 shown in FIG. 4. In this condition, indicated by the unique situation of the switches 4 and 5 being "true", the read and write operations can be safely performed on the memory card 1. The user cannot extract the memory card 1 without using the eject button 2.

Please refer to FIG. 3c, which shows the card detect pin in the closed status of the second switch 5. The eject button 2 is operated on by the user. A pushing pressure causes the button 2 to move inwardly, causing second switch 5 to turn into an on state. Switch 4 is still "true". This state immediately indicates to the controller (not shown) which may be performing the read or write operations on the on the memory card 1. In this condition, indicated by the unique situation in which the first switch 4 and the second switch 5 are in a close loop state, read and write operations can safely be performed on the memory card 1.

Figure 3D:
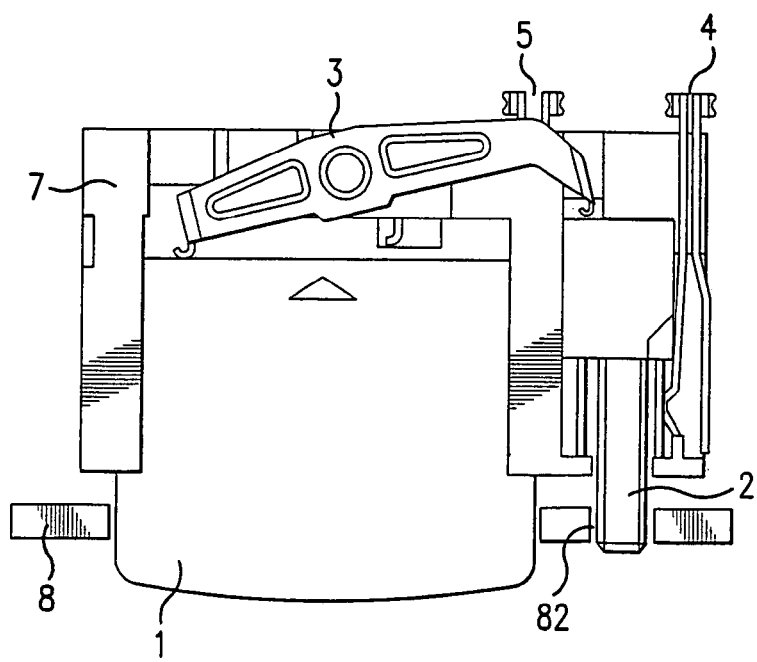

Please refer to FIG. 3d, which shows the physical extraction of the memory card 1. If the user continues pushing, however, the eject button 2 will move further inward and after a few millimeters of travel act upon the eject lever 3 which bears on the front edge of the memory card 1. In the illustrated embodiment the eject lever 3 is mounted in the housing 7 in such a way that it pivots about a point that is generally central in its length, and causes the memory card 1 to be pushed back out through the aperture 81 in the bezel 8. The switch 5 is made to turn into an open loop state during this step and switch 5 is "true" initially, but turns "false" (open) when the memory card 1 is removed.

Figure 3E:
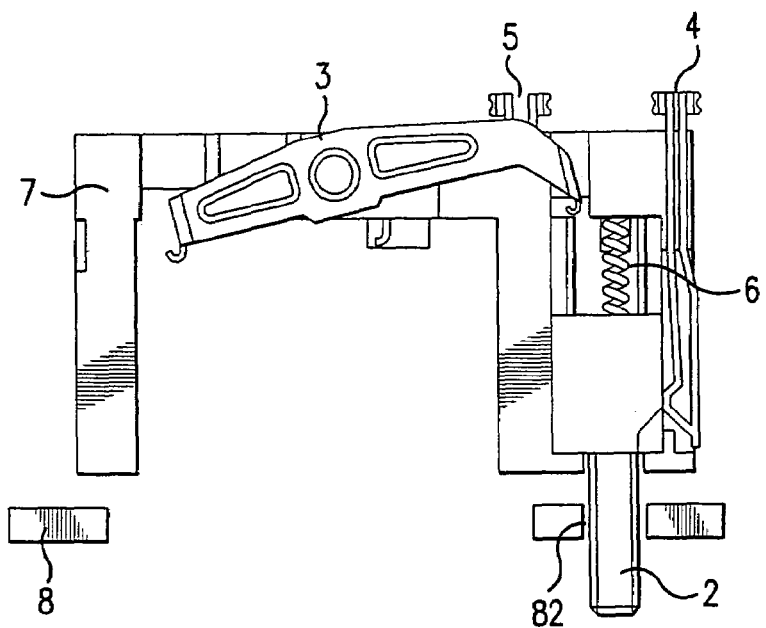
Figure 3F:
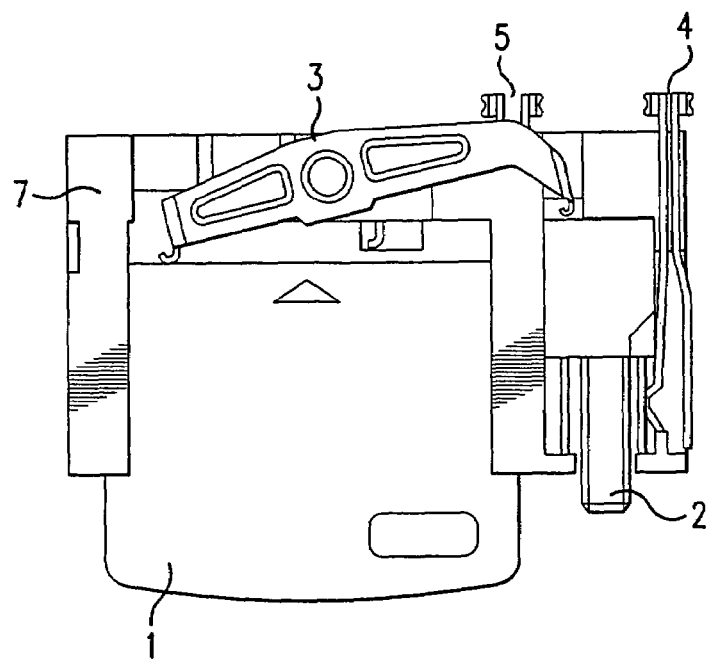
Figure 4:
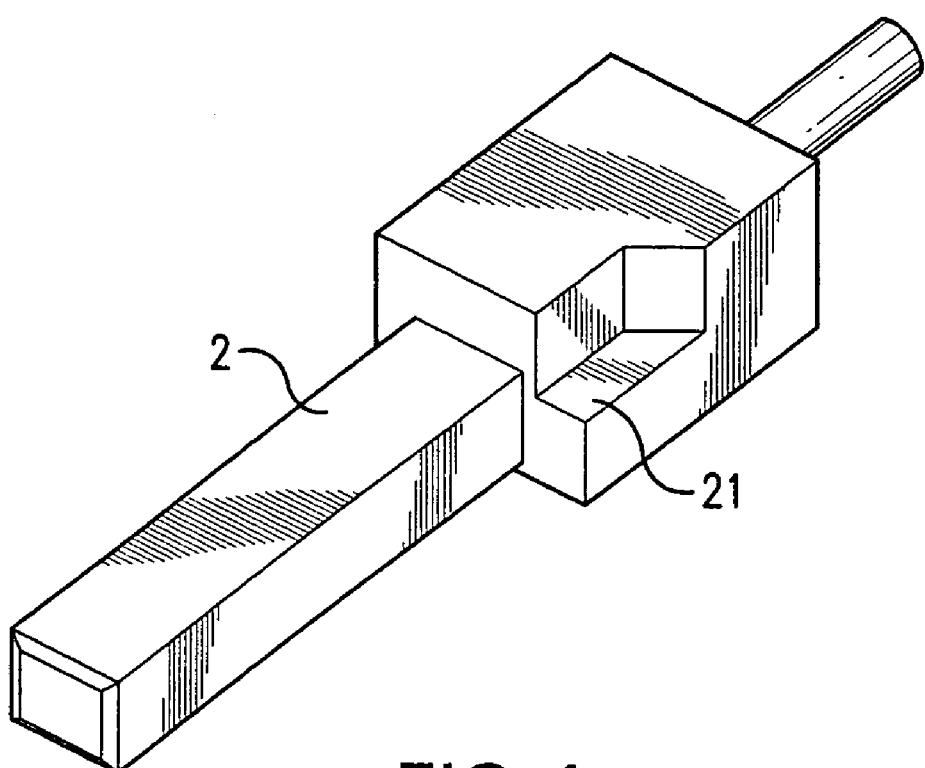
FIG. 4 is a perspective view of the notch 21 of the eject button 2 features that the second switch 5 detects, according to an embodiment of the present invention.

Please refer to FIGS. 3e and 3f, which shows the procedure of compressing the eject button 2 in order to eject the memory card 1. While a user is continually pressing the ejecting button 2, meanwhile, the elasticity element 6 is compressed by the ejecting button 2 and makes the first switch 4 turn into an off state, at present the power cannot pass to the memory card 1. If the user further continually compresses the join mechanism 3, the memory card 1 will eject from the memory card reader device, and force the first switch 4 and the second switch 5 to turn into an off state, and this makes the power and the memory card 1 turn into an open loop state so as to eject the memory card 1. While the ejecting button 2 does not need to be continually compressed by a user, the elasticity element 6 will force the eject button 2 back to its original position and makes the first switch 4 turn into the close state and the second switch 5 to turn into the open state Please refer to FIG. 4, which shows a perspective view of the notch 21 of the eject button 2 which is the feature that the second switch 5 detects, according to an embodiment of the present invention. As shown in FIG. 4, the eject button 2 of the present invention further comprising a notch 21 to aid the second switch 5 with sensing the position of the eject button 2.

Figure 5:
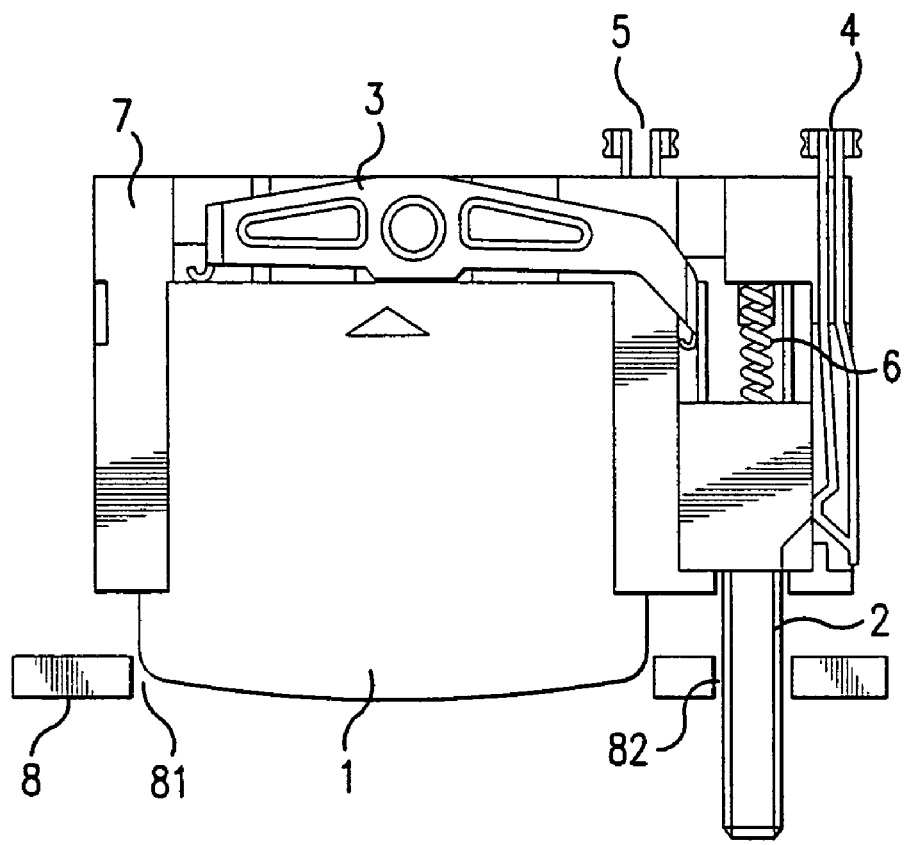
FIG. 5 is a plan view showing that the memory card 1 fully seated in the device can only be extracted with the use of the eject button 2, according to an embodiment of the present invention.

Please refer to FIG. 5, which shows a plan view in which the memory card 1 is fully seated in the device and can only be extracted with the use of the eject button 2, according to an embodiment of the present invention. As shown in FIG. 5, illustrating that the memory card 1 is fully seated into the housing 7 and the user cannot pull the memory card 1 out because there is no edge accessible protruding from the bezel aperture 81 for a user to gain a grip. The rear edge of the memory card 1 is at least flush, or recessed 1 or 2 millimeters below the surface of the bezel 8, into the bezel aperture 81. The switch 4 and the switch 5 are both "true" and now while these switches indicate a "true" condition the read and write operations can be performed safely on data stored in the memory card 1. FIG. 5 shows this fully seated position where the rear edge of the memory card 1 is at least flush, or recessed 1 or 2 millimeters below the surface of the bezel 8, into the bezel aperture 81. The switch 4 and the switch 5 are both "true" and when these switches indicate a "true" condition the read and write operations can be carried out safely on the data stored in the memory card 1.

Furthermore, the present invention also provides a method for safely reading from and writing to a memory card reader device, which comprises the steps of: providing a first switch 4, a second switch 5, a join mechanism 3, and a ejecting button 2, wherein, the first switch 4 is coupled to the second switch 5, while the first switch 4 or the second switch 5 is coupled to the power, then another switch is coupled to the ground, and the ejecting button 2 further comprising an elasticity element 6 (step 1); inserting the memory card 1 into a slot (not shown) of the memory card reader device, meanwhile, the join mechanism 3 is compressed by the memory card 1, which makes the second switch 5 turn into an on state, and then makes the first switch 4 and second switch 5 turn into a close loop state, thus the power is passed to the memory card reader device so that the memory card reader device can read data from or write data to the memory card 1 (step 2); and pressing the ejecting button 2, which makes the eject button 2 compress the elasticity element 6 and makes the first switch 4 turn into an off state, and makes the memory card 1 eject from the memory card reader device by compressing the join mechanism 3, and forces the first switch 4 and the second switch 5 to turn into an off state, which makes the power and the memory card 1 turn into an open loop state so as to eject the memory card 1, while the ejecting button 2 does not need to be continually compressed by a user, the elasticity element 6 will force the ejecting button 2 back to its original position and make the first switch 4 turn into the close state and the second switch 5 turn into the open state (step 3).

Those who are skilled in the art would recognize that many physical implementations could be realized for the accurate location of the printed circuit board in relation to the flash memory card, to ensure accurate alignment of the cards electrical contacts as this invention teaches without departing from the spirit thereof.

It should be understood that one who is skilled in the art can make a number of variations in the hardware and system software elements within the scope of this invention without departing from the sprit thereof. Accordingly, this invention should be defined by the scope of the claims as broadly as the prior art will permit.

While the invention has been described with reference to a preferred embodiment thereof, it is to be understood that modifications or variations may be easily made without departing from the spirit of this invention, which is defined by the appended claims.

What is claimed is:

1. A method to safely read from and write to a memory card in a memory card reader device, wherein power is safely provided to the said memory card reader device and the said memory card, wherein the said memory card reader device can safely read data from or write data to the said memory card, which comprises the steps of:

providing a first switch, a second switch, a join mechanism and an ejecting button, wherein, the said first switch is coupled to the said second switch, another switch is coupled to the ground while the said first switch or the said second switch is coupled to a power, and the said ejecting button further comprises an elasticity element; inserting the said memory card into a slot of the said memory card reader device, meanwhile, the said memory card compresses the said join mechanism, which thereby makes the said second switch turn into an on state, and then makes the said first switch and the said second switch turn into a close loop state, thus the said power passes to the said memory card reader device so that the said memory card reader device can read data from or write data to the said memory card; and pressing the said ejecting button, meanwhile, the said ejecting button compresses the said elasticity element, which thereby makes the said first switch turn into an off state, and makes the said memory card eject from the said memory card reader device when it compresses the said join mechanism, and forces the said first switch and the said second switch to turn into an off state, and then makes the said power and the said memory card turn into an open loop state so as to eject the said memory card, while a user does not have to continually compress the said ejecting button, the said elasticity element will force the said ejecting button back to its original position, which makes the said first switch turn into the said close state and the said second switch turn into the said open state.

2. The method to safely read from and write to a memory card in a memory card reader device according to claim 1, wherein the said memory card is a Smart Media memory card, a memory stick memory card, a SD memory card, a Multimedia memory card or a xD memory card.

3. The method to safely read from and write to a memory card in a memory card reader device according to claim 1, wherein the said first switch is cascaded to the said second switch.

4. The method to safely read from and write to a memory card in a memory card reader device according to claim 1, wherein the said join mechanism is an eject lever mechanism.

5. The method to safely read from and write to a memory card in a memory card reader device according to claim 1, wherein the said elasticity element is a spring element or an elastomer.

6. The method to safely read from and write to a memory card reader device according to claim 1, wherein the said first switch is a normal close switch and the said second switch is a normal open switch.

7. The method to safely read from and write to a memory card in a memory card reader device according to claim 1, wherein the said first switch and the said second switch are in an on state, said power passes to the said memory card so that the said memory card reader device can safely read data from or write data to the said memory card.

8. The method to safely read from and write to a memory card in a memory card reader device according to claim 1, wherein the said first switch is in an on state and the said second switch is in an off state, the said power can not pass to the said memory card so that the said memory card reader device can not read data from or write data to the said memory card.

9. The method to safely read from and write to a memory card in a memory card reader device according to claim 1, wherein the said first switch is in a turn off state and the said second switch is in a turn on state, the said power can not pass to the said memory card reader device, and indicates that the said memory card can safely be ejected from the said memory card reader device.

10. The method to safely read from and write to a memory card in a memory card reader device according to claim 1, wherein the said eject button further comprises a notch to aid the said second switch in sensing the position of the said eject button.

11. A memory card reader device, which provides power safely to the said memory card reader device and a memory card, so that the said memory card reader device can safely read data from or write data to the said memory card, comprising: a housing, having a slot on its front bezel;
an eject button, slidably mounted in said housing, further comprising an elasticity element to compress the said eject button, which causes the first switch to be in a normal close state;
a join mechanism, pivotably mounted in the said housing; which is actuated when the eject button is being compressed or a memory card is inserted;
a first switch, positioned on a side of the said housing and coupled to the said power to control and to ensure that the said memory card reader device must be in an off state before the said memory card is ejected;
a second switch, also positioned on the said side of the said housing, which detects the said memory card whether it is fully inserted or not;
thereby, when the said memory card is inserted into the said slot of the said memory card reader device, the said memory card compresses the said join mechanism which makes the said second switch turn into an on state, which then makes the said first switch and the said second switch turn into a close loop state, thus the said power passes to the said memory card reader device so that the said memory card reader device can read data from or write data to the said memory card; while it compresses the said ejecting button, the said elasticity element is compressed by the said ejecting button, which thereby makes the said first switch turn into an off state, and which makes the said memory card eject from the said memory card reader device.

12. The memory card reader device according to claim 11, wherein the said memory card is a Smart Media memory card, a memory stick memory card, a SD memory card, a Multimedia memory card, or an xD memory card.

13. The memory card reader device according to claim 11, wherein the said first switch is cascaded to the said second switch.

14. The memory card reader device according to claim 11, wherein the said join mechanism is a lever mechanism and the said elasticity element is a spring element or an elastomer.

15. The memory card reader device according to claim 11, wherein the said first switch is a normal close switch and the said second switch is a normal open switch.

16. The memory card reader device according to claim 11, wherein the said first switch and the said second switch is in an on state, whereby the said power passes to the said memory card so that the said memory card reader device can safely read data from or write data to the said memory card.

17. The memory card reader device according to claim 11, wherein the said first switch is in an on state and the said second switch is in an off state, whereas the said power can not pass to the said memory card; therefore, the said memory card reader device can not read data from or write data to the said memory card.

18. The memory card reader device according to claim 11, wherein the said first switch is in an off state and the said second switch is in an on state, the said power can not pass to the said memory card reader device, and indicates that the said memory card can safely be ejected from the said memory card reader device.

19. The memory card reader device according to claim 11, which further comprises a first aperture and a second aperture on the said front bezel, wherein the said first aperture has a rectangular shape which supports the said memory card being inserted into the said slot and the said second aperture has a square shape thereby allowing the said eject button to outwardly protrude from the bezel so that the user can press the eject button conveniently.

20. The memory card reader device according to claim 11, wherein the said eject button further comprises a notch to aid the said second switch in sensing the position of the said eject button.

* * * * *